June 12, 1951 R. P. H. HINDS 2,556,328
NONGLARE MOTOR VEHICLE HEADLIGHT

Filed May 6, 1946 2 Sheets-Sheet 1

INVENTOR
Reinhard Paul Henry Hinds
By

June 12, 1951 R. P. H. HINDS 2,556,328
NONGLARE MOTOR VEHICLE HEADLIGHT
Filed May 6, 1946 2 Sheets-Sheet 2

INVENTOR
Reinhard Paul Henry Hinds
By

Patented June 12, 1951

2,556,328

UNITED STATES PATENT OFFICE 2,556,328

NONGLARE MOTOR VEHICLE HEADLIGHT

Reinhard Paul Henry Hinds, Petts Wood, England

Application May 6, 1946, Serial No. 667,534
In Great Britain November 16, 1944

Section 1, Public Law 690, August 8, 1946
Patent expires November 16, 1964

4 Claims. (Cl. 240—41.3)

1

This invention relates to lamps for vehicles and in particular to "fog" lamps for motor road vehicles.

A popular form of such "fog" lamps consists of a lamp of oval shape having a ribbed or fluted lens or front glass.

The object of the present invention is to provide an improved construction of lamp of this kind designed to give improved illumination and improved facility of manufacture.

According to the main feature of the invention the improved construction of lamp comprises in combination a circular parabolic reflector, a lamp bulb having a transverse horizontally positioned filament, and an elliptical or oval front glass or lens. Preferably the oval front glass is ribbed or fluted vertically on its outer surface. The said oval front glass may be convex about its central vertical axis and the fluting may be formed by alternate convex and concave surfaces, with the radius of curvature of the convex portions preferably greater than the radius of curvature of the concave portions.

According to a further feature of the invention I provide a shield for the lamp bulb which interrupts its direct rays excepting for such rays directed toward diametrically opposite segmental portions of the lens so that the beam issuing from the lamp consists preponderately of reflected light, with laterally disposed side portions including direct light whilst still another feature of the invention resides in an improved method of mounting the lamp bulb, according to which the lamp bulb is fitted into a socket forming part of a fitting adapted to be removably attached to the back of the reflector, without the use of screws.

Preferably the socket contains a removable shouldered insulated plug which carries spring contacts at its inner end and connections for the current leads at its outer end, said plug projecting through a hole in the outer end of the socket, with its shoulder engaging the flange surrounding said hole.

In order that the invention may be clearly understood and readily carried into practice it is illustrated, by way of example only, by the accompanying drawings, in which.

2

Figure 1:
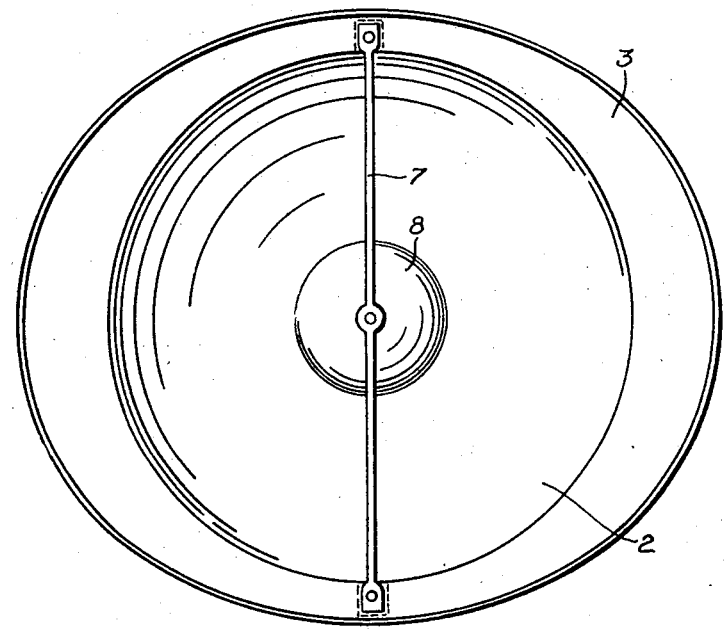
Figure 1 is a front elevation of the lamp with its cover glass or lens removed.
Figure 2:
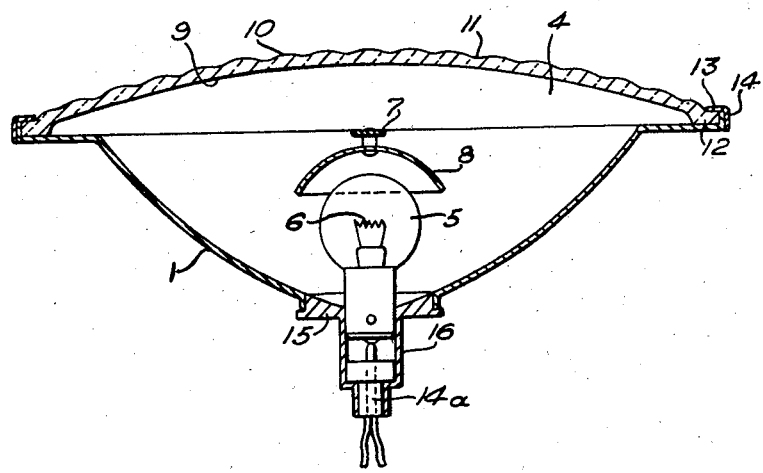
Figure 2 is a horizontal cross-sectional view of the lamp.
Figure 3:
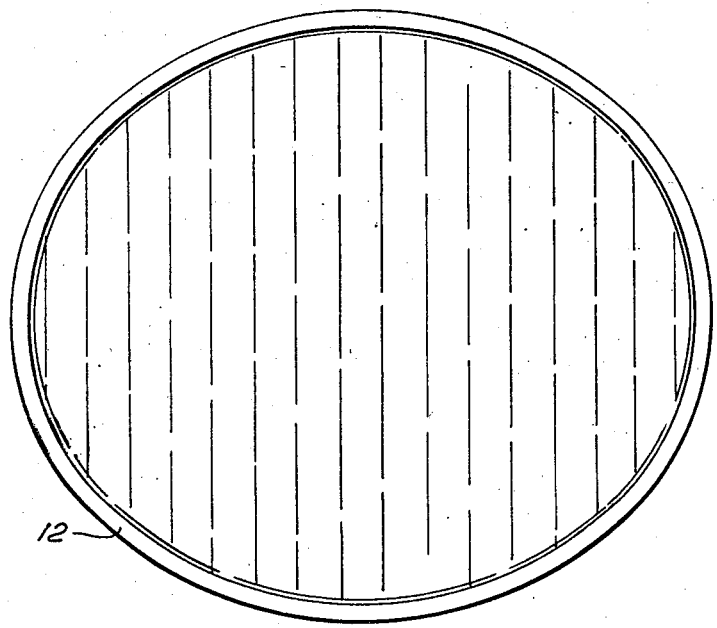
Figure 3 is a plan or face view of the cover glass or lens.
Figure 4:
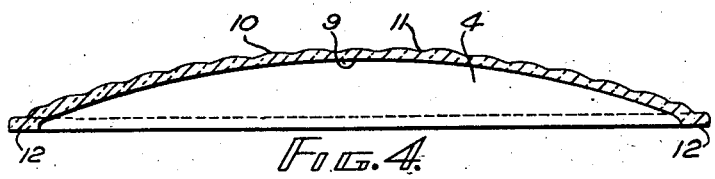
Figure 4 is a longitudinal section thereof.
Figure 5:
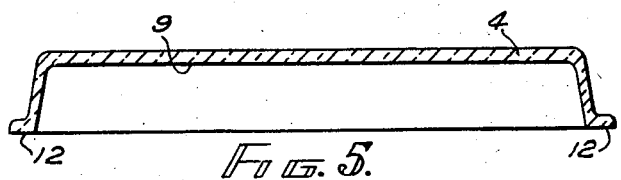

Figure 5 is a cross-section thereof, and

Figure 6:
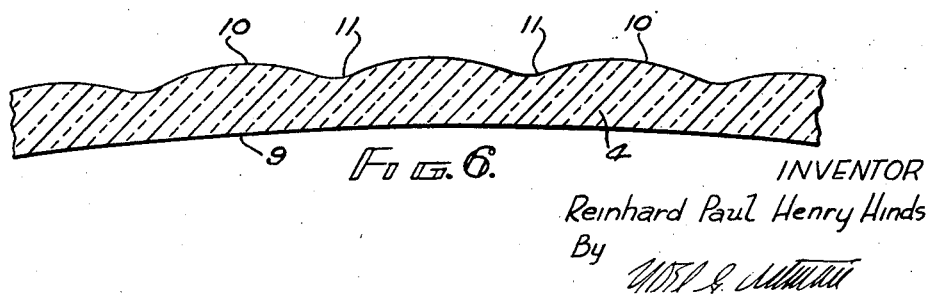

Figure 6 is an enlarged detail view of one form of fluting.

The lamp comprises a stamped or spun metal reflector 1 which has a circular parabolic reflecting surface 2 bordered by an elliptical flange 3, which receives an elliptical front glass or lens 4.

The lamp bulb 5 has a linear filament 6 which is disposed horizontally when the lamp is mounted for use, and is located transversely to the focal axis of the parabolic reflector 2. The central portion only of the filament will be in correct focus, but its side portions will be utilised in producing, although slightly out of focus, a good lateral dispersal of light.

In front of the lamp bulb 5 is arranged a bridge 7 which supports at its centre a dulled or blackened concave nonreflecting glare shield 8 which shields the lens 4 from direct rays of the filament 6 excepting for laterally-spaced lens portions adjacent to the ends of the major axis of the elliptical lens 4, wherefore this shield materially reduces the dazzling effect of the lamp.

In order fully to utilise the rays dispersed laterally from the reflector the oval cover glass 4 is of convex form about its central vertical axis, so that its top and bottom edges stand away from the flange 3 in the central vertical plane, and its side edges are close to the flange 3. The glass 4 may have a smooth or undulating inner surface 9, and has a vertically fluted outer surface 10, 11. The flutings are formed by adjacent convex and concave surfaces 10, 11 respectively, the convex surfaces 10 being preferably of greater width than the concave surfaces 11 so the lens body will consist essentially of a plurality of vertical prisms with convex front surfaces capable of horizontally fanning and directing the light rays an amount predeterminable by the radius of curvature of the convex surfaces.

The exact dimensions of the flutes are variable, but in general, in a glass measuring some seven or eight inches along its major axis, the convex surfaces of the fluting may be about 0.5" wide and the concave surfaces about 0.125" wide.

According to a modification the widths of the convex and concave fluting surfaces may diminish from the vertical centre line of the glass, either gradually to its outside edges, or a series of wide flutes may be provided in the centre portion of the glass flanked on each side by a series of narrower flutes.

The glass 4 has a peripheral flange 12 whereby it is retained in position on the flange 3, by a retaining ring 14, removably secured to the flange 3 in any convenient manner.

The lamp bulb 5 fits into the socket or holder 16 of a fitting 15 mounted on the back of the reflector 1, into which is fitted an insulating plug 14a carrying normal spring contacts at its inner end and terminal connections for the current leads at the other end. The plug 14a is formed with a shoulder which engages a stop flange surrounding the hole in the end of the socket 16 through which the plug 14a projects. The fitting 16 may be provided with bayonet slots for engagement by pins on the lamp base, in well-known manner, when the lamp has been inserted into the socket 16, into engagement with the spring contacts of plug 14a. The fitting 15 may be removably attached to the back of the reflector in any convenient manner, preferably without the use of screws, as by a spring ring.

I claim:

1. A vehicle headlamp unit comprising a circular parabolic reflector, means for supporting a light source substantially at the focal point of such reflector, an oval lens disposed in opposed relation to the concave side of the reflector, the minor axis of said lens being of a length substantially equal to the diameter of the reflector at its rim and the ends of said lens along its major axis extending marginally beyond diametrically opposite rim portions of the reflector and spaced therefrom lengthwise of the focal axis, said lens embodying a simple concavo-convex curvature along its principal axis and presenting its concave face toward the reflector, and said lens also embodying a series of laterally-spaced rectilinear thickened portions traversing the same in parallelism with its minor axis.

2. A vehicle headlamp unit comprising a circular parabolic reflector disposed with its focal axis substantially horizontally, an elongated light source disposed horizontally across said focal axis substantially at the focal point of the reflector, an oval lens disposed in opposed relation to the concave side of the reflector adjacently to its rim while the major axis of the lens is horizontal and the minor axis thereof vertical, the length of the lens along its major axis exceeding the diameter of the reflector and the width of the lens along its minor axis being substantially equal to such diameter of the reflector, said lens embodying a simple concavo-convex curvature along its principal axis and presenting its concave face toward the reflector, and said lens also embodying a series of horizontally-spaced rectilinear thickened portions traversing the same vertically for horizontally diffusing light rays projected therethrough from the reflector.

3. A vehicle headlamp unit comprising a circular parabolic reflector disposed with its focal axis substantially horizontally and having a flange circumscribing and projecting outwardly from its large diameter front end substantially in a vertical plane, an elongated light source disposed horizontally across said focal axis substantially at the focal point of the reflector, a lens having an oval rim assembled with the front face of said flange and having its major axis disposed horizontally, said lens also having an oval light reflecting portion disposed with its major axis horizontal and bowed forwardly at its center in a concavo-convex formation of simple curvature along such axis to cause the upper and lower edges of such oval light refracting portion to be spaced forwardly from the rim more distantly than the edges at the horizontally opposite ends thereof, said lens also having a substantially tubular wall formation of oval transverse section projecting horizontally forwardly from said oval rim to the oval perimeter of the light refracting portion, and said light refracting portion embodying a series of horizontally-spaced rectilinear thickened portions traversing the same vertically for horizontally diffusing light rays projected therethrough from the reflector.

4. A vehicle headlamp lens having an oval rim and also having an oval light refracting portion disposed at one axial end of the rim and with the major axis of said light refracting portion in parallelism with the major axis of the rim, said light refracting portion being bowed in said axial direction from the rim at its center in a concavo-convex formation of simple curvature along the major axis thereof to cause the opposite longer radius edges of such oval light refracting portion to be spaced in such axial direction from the rim more distantly than the opposite edges of shorter radius thereof, and said lens also having a substantially tubular wall formation of oval transverse section projecting axially from said oval rim to the oval perimeter of the light refracting portion, and said light refracting portion embodying a series of laterally-spaced rectilinear thickened light ray diffusing portions traversing the same in parallelism with its minor axis.

REINHARD PAUL HENRY HINDS.

REFERENCES CITED

The following references are of record in the file of this patent:

UNITED STATES PATENTS

| Number | Name | Date |
|---|---|---|
| 110,449 | Felthousen | Dec. 27, 1870 |
| 1,489,697 | Carson | Apr. 8, 1924 |
| 1,634,528 | Wood | July 5, 1927 |
| 1,941,079 | Exelmans | Dec. 26, 1933 |
| 1,991,866 | Rich | Feb. 19, 1935 |
| 2,110,132 | Douglas | Mar. 8, 1938 |

FOREIGN PATENTS

| Number | Country | Date |
|---|---|---|
| 341,226 | France | June 3, 1904 |